United States Patent [19]
Schenk

[11] 3,727,993
[45] Apr. 17, 1973

[54] WHEEL LOCK CONTROL MODULATOR

[75] Inventor: Donald E. Schenk, Dayton, Ohio

[73] Assignee: General Motors Corporation, Detroit, Mich.

[22] Filed: Jan. 13, 1972

[21] Appl. No.: 217,543

[52] U.S. Cl. ............... 303/21 F, 188/181 A, 251/25, 303/6 R
[51] Int. Cl. ............................................. B60t 8/02
[58] Field of Search ....................... 303/21 F, 6 R, 10, 303/61; 188/181 A; 251/25, 30

[56] References Cited

UNITED STATES PATENTS

| | | | |
|---|---|---|---|
| 3,480,335 | 11/1969 | Inada | 303/21 F |
| 3,592,514 | 7/1971 | De Hoff | 303/21 F |
| 3,623,778 | 11/1971 | Horvath | 188/181 A X |

Primary Examiner—M. Henson Wood, Jr.
Assistant Examiner—Michael Mar
Attorney—W. E. Finken et al.

[57] ABSTRACT

A wheel lock control system in which the brake apply pressure modulator is divided into four chambers, one always subjected to super-atmospheric pressure and normally providing pressure support to the hydraulic displacement piston, one always being subjected to vacuum during operation, and the other two being subjected to vacuum or atmospheric air pressure or super-atmospheric air pressure or some intermediate pressure depending upon the system operational mode to control movement of the brake apply pressure modulating valve displacement piston.

4 Claims, 1 Drawing Figure

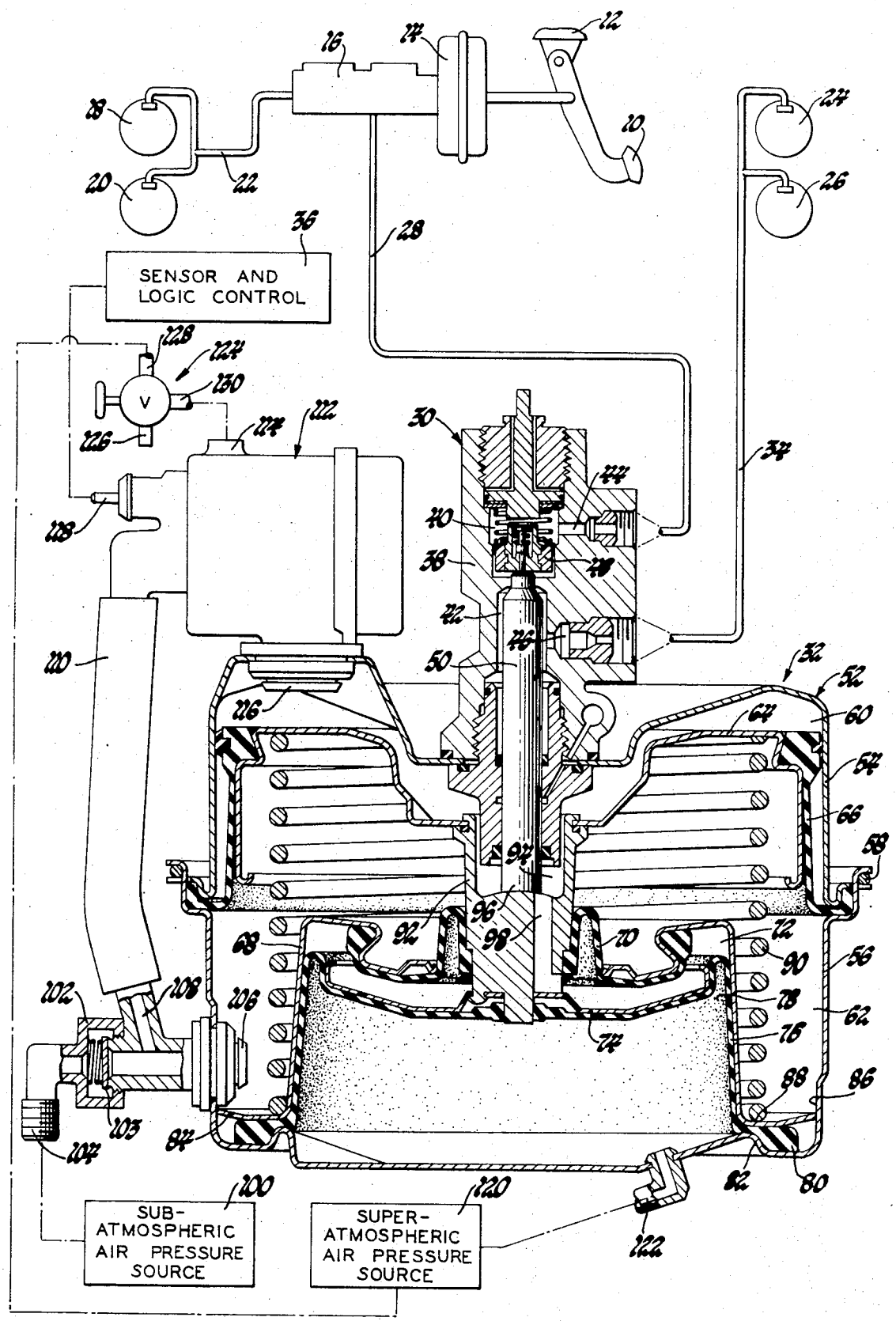

WHEEL LOCK CONTROL MODULATOR

The invention relates to a wheel lock control modulator and more particularly to one in which hydraulic brake apply support pressure is provided by a support spring acting on a movable upper support plate and also by an air pressure differential acting on a lower support plate and diaphragm, the higher air pressure being above atmospheric pressure. The system in which the modulator is used has a master cylinder assembly which when actuated generates brake supply pressure which passes through the modulator brake apply pressure modulating valve means and is delivered as brake apply pressure to the brakes for the wheel or wheels being controlled by the system. In normal operation, substantially unrestricted brake apply fluid flow and pressure is permitted between the master cylinder and the wheel brakes. However, when the sensing mechanism senses an impending wheel lock condition, a logic control generates appropriate signals to actuate the modulator to provide pressure changes to it which decrease the support force holding the displacement piston of the modulator in the normal or inactive position, and also oppose the spring-provided support force to the displacement piston in an amount sufficient to overcome the spring support force and permit movement of the displacement piston to close the modulating valve means and prevent additional brake supply pressure from being transmitted from the master cylinder to the wheel brakes. When required, further movement of the displacement piston is permitted to enlarge the volume remaining connected to the wheel brakes and thereby decrease the actual wheel brake apply pressure as needed. The decrease in wheel brake apply pressure will permit the wheels to accelerate away from the incipient wheel lock condition. When the incipient wheel lock condition is no longer being sensed, and a signal is generated accordingly, the modulator is again controlled so as to permit the support spring force to be greater than the force opposing it and to again provide additional air pressure differential support pressure. The displacement piston returns the modulating valve means to the normal brake apply condition.

The modulator embodying the invention is an improvement on the modulator described in U.S. Pat. No. 3,401,987, entitled "Pressure Modulator Valve For Anti-Lock Brake System", and issued Sept. 17, 1968, and on the modulator described in U.S. Pat. Application Ser. No. 195,249 filed Nov. 3, 1971, and entitled "Wheel Lock Control Modulator." The sensor and logic control means used may be of the type disclosed in U.S. Pat. No. 3,554,612, entitled "Anti-Lock Brake Control", and issued Jan. 12, 1971.

In the drawing:

The single FIGURE includes a schematic illustration of the wheel lock control system embodying the invention, with the modulator having parts illustrated in section.

The wheel lock control system includes a brake pedal 10 suitably pivoted to a portion 12 of the vehicle in which it is installed, a power brake booster 14 connected to actuate the master cylinder 16 in the usual manner when the brake pedal 10 is depressed, front wheel brakes 18 and 20 connected by conduit 22 with the master cylinder assembly 16, and rear wheel brakes 24 and 26. Since the system is illustrated as controlling the rear wheel brakes, the rear wheel brake conduit 28 from the master cylinder 16 is connected to the modulating valve means 30 which forms a part of the modulator assembly 32. Conduit 34 connects the modulating valve means 30 and the rear wheel brakes 24 and 26. The system has suitable sensor and logic control means 36 of a type well known in the art. The sensor arrangement is provided in the particular system illustrated to sense the rotational characteristics of the rear wheels so that incipient wheel lock conditions can be determined and acted upon to prevent rear wheel lock. If one or more of the front wheel brakes are to be controlled by the modulator the sensor would of course sense the wheel or wheels associated therewith, and the modulator would be hydraulically connected accordingly. The sensor portion provides information to the logic control portion and signals are generated to be transmitted to the modulator assembly 32.

The valve assembly 30 may be of the type generally disclosed in the first U.S. patent referred to above. The modulating valve means 30 includes a valve housing 38 formed to provide valve chamber 40, displacement chamber 42, port 44 connecting conduit 28 to chamber 40, and port 46 connecting conduit 34 to chamber 42. The valve unit 48 in chamber 40 is controlled by the displacement piston 50 which is reciprocably mounted in the displacement chamber 42 and extends into the valve chamber 40. In the valve position illustrated in the drawing, brake supply pressure is transmitted from the master cylinder 16 through conduit 28 and port 44 and through valve chamber 40, past valve 48 into displacement chamber 42 as brake apply pressure, and out port 46 to conduit 34 and the rear wheel brakes 24 and 26. This fluid communication channel is maintained open by support pressure forces so long as there is no need for wheel lock control operation. When the sensor and logic control means signals a requirement for wheel lock control operation, the modulator assembly 32 is activated in a manner to be described. Piston 50 is permitted to be moved downwardly by brake supply pressure and valve unit 48 closes, fluid disconnecting conduit 28 from conduit 34. Further downward movement of piston 50 under influence of the brake apply pressure in chamber 42 increases the volume of displacement chamber 42, thereby decreasing the brake apply pressure in conduit 34 and the rear wheel brakes 24 and 26. This type of operation is disclosed in the above-noted U.S. patents and is well known in the prior art.

The modulator assembly 32 also includes a housing 52 having an upper section 54 to which the modulating valve means housing 38 is secured, and a lower section 56 sealingly secured to the upper section by locking means 58 and the outer annulus of a sealing diaphragm to be described.

The housing 52 is divided into four chambers, the first chamber 60 and the second chamber 62 being separated by the upper support plate 64 and diaphragm 66. The outer annulus of diaphragm 66 seals the two housing sections 54 and 56 adjacent the locking means 58. A divider plate 68 and diaphragm 70 separate the second chamber 62 from the third chamber 72. A lower support plate 74 and diaphragm 76 separate the third chamber 72 and the fourth chamber 78. The outer annulus 80 of diaphragm 76 is held in sealing engagement with a portion 82 of the housing lower section 56. The locking means 84, formed on the outer periphery of divider plate 68, includes spring locking tabs which lockingly engage the inner surface 86 of the housing lower section 56 when the divider plate is pushed into position. The locking tabs prevent retraction of the divider plate and also exert a force holding the diaphragm 76 in position. The divider plate flange from which the locking means 84 is formed also provides a spring seat 88 for support spring 90. This spring is contained in chamber 62 and engages the upper support plate 64 so as to urge that plate upwardly at all times.

Upper support plate 64 and lower support plate 74 are joined and held in spaced relation by the plate carrier 92. The upper end of the carrier has a recess 94 which opens into chamber 60. The base of the recess engages the lower end 96 of the displacement piston so that all forces exerted between the support plates and the displacement piston are mechanically transmitted through the plate carrier at this point. A passage 98 is formed through plate carrier 92 and maintains a fluid connection at all times between first chamber 60 and third chamber 72.

The vacuum source 100 is connected by an appropriate conduit to check valve housing and fitting 102. This is in effect a tee fitting, with one opening 104 connected to the vacuum source through the check valve 103, another opening 106 communicating with second chamber 62, and a third opening 108 connected to conduit 110. This conduit is connected to solenoid valve assembly 112, which is mounted on housing section 54 and has an opening 116 communicating with first chamber 60. When the valve contained within solenoid valve assembly 112 is open, vacuum is communicated to first chamber 60 and that chamber is also fluid connected to second chamber 62 through conduit 110 and the tee fitting openings 108 and 106. When the valve is closed, the vacuum source is disconnected from the first chamber 60, as is second chamber 62. The valve assembly 112 has an opening 114 which is connected to opening 116 when the valve is closed. Sensor and logic control means or mechanism 36 is connected to the terminal 118 of the valve assembly 112 so that signals generated by the mechanism 36 will control the opening and closing of the valve of assembly 112.

The super-atmospheric air pressure source 120, while schematically illustrated, may be an air pump, with or without a pressure reservoir, of the type now commonly used to provide air injection in engine exhaust areas to insure more complete fuel combustion. Alternatively, and by way of example, the air pump may be one providing pressure for an automatic vehicle leveling system. If the pressure range of such a pump is greater than that needed, appropriate pressure controls may be provided. Pressure source 120 is connected to fitting 122 and maintains a super-atmospheric pressure in chamber 78. It is also connected through schematically illustrated three-way valve 124 to opening 114 of valve assembly 112. Valve 124 has an atmospheric air inlet 126, a super-atmospheric air pressure inlet 128, and an outlet 130. It may be selectively positioned to connect either inlet 126 or inlet 128 with outlet 130, depending on whether or not it is desired to operate the modulator with a mixture of vacuum and atmospheric air pressures or vacuum and super-atmospheric air pressures to obtain the modulated pressure in chamber 60. While selector valve means 124 is schematically illustrated as separate from valve assembly 112, it may be integrated with and provided as a part of the control valve means of assembly 112. If only atmospheric air pressure is needed at opening 114, that opening may be directly connected to atmosphere and valve 124 and the conduit connecting it with valve assembly 112 and super-atmospheric air pressure source 120 may be omitted.

In normal brake vehicle operation, the modulator assembly 32 is in the condition shown so that brake fluid flow and pressure is delivered from the master cylinder 16 to the front and rear wheel brakes without any modulation by the modulator. However, during excessive brake apply, the sensor and logic control mechanism 36 senses an incipient wheel lock condition, and a signal is delivered to solenoid valve assembly 112 to close the valve therein. Prior to the closing of this valve, vacuum was impressed in chambers 60, 62 and 72 and super-atmospheric pressure was contained in chamber 78, from source 120. The differential pressure acting against the lower support plate 74 and diaphragm 76 provides a support pressure or force which is exerted through plate carrier 92 to the lower end 96 of displacement piston 50 to hold that piston in the upward position. Also, the force exerted by support spring 90 on the upper support plate 64 provides additional support pressure or force. These two additive support forces hold the displacement piston upward against master cylinder-generated brake supply pressure exerted on the piston in chambers 40 and 42 and urging the piston downwardly. They are sufficient to hold the piston upwardly throughout the range of brake apply pressure to the rear wheel brakes. The amount of such pressure so supported is the support pressure, and this provides the upper pressure limit beyond which the brake apply pressure will not be increased without moving displacement piston 50 downwardly. Therefore, the valve assembly 30 is maintained open and flow between conduits 28 and 34 is substantially unrestricted.

With the closure of the valve in valve assembly 112, air from opening 114 is admitted to first chamber 60 and, through recess 94 and passage 98, to third chamber 72. The pressure differential then acting across upper support plate 64 and diaphragm 66 overcomes the force of support spring 90 to move the plate carrier 92 downwardly. Also, the pressure differential across lower support plate 74 and diaphragm 76 is decreased or entirely depleted, and the support pressure or force earlier obtained is decreased or eliminated. Downward movement of plate carrier 92 removes the support force from the lower end 96 of displacement piston 50 and the brake apply pressure in chambers 40 and 42 moves piston 50 downwardly. This closes valve unit 48 to disconnect ports 44 and 46. Therefore, the master cylinder cannot supply additional braking pressure to the rear wheel brakes 24 and 26. If the signal being received by the solenoid valve assembly 112 continues to require the rear brake release operational mode, the support plate carrier continues to move downwardly and the brake apply pressure remaining in chamber 42 continues to force piston 50 downwardly. This increases the volume of chamber 42 and therefore decreases the brake apply pressure in port 46, in conduit 34, and at the rear wheel brakes 24 and 26. This decreases the braking force at the rear wheels and they are permitted to accelerate away from the incipient wheel lock condition earlier sensed. The sensor and logic control mechanism 36 senses this change in wheel rotating condition and signals the solenoid valve assembly 112 so that the valve therein is opened. This closes the valve connection to opening 114 and readmits vacuum to chambers 60 and 72. Thus, full super-atmospheric air support pressure is again provided and the pressure differential which compressed support spring 90 is removed. Therefore, the pressure differential acting across lower support plate 7 and diaphragm 76 and the force exerted by support spring 90 move the plate carrier 92 upwardly, moving displacement piston 50 upwardly to the position shown in the drawing. The valve unit 48 is reopened and fluid communication is again established between conduits 38 and 34. The rear brake supply pressure in conduit 28 can again be exerted as brake apply pressure at the rear wheel brakes 34 and 26, and additional braking force may be provided there. This cyclic operation will continue until the sensor and logic control mechanism 36 no longer generates an incipient wheel lock signal at any time. This may occur because the brake pedal has been released, decreasing or eliminating the brake supply pressure, or because the rear wheels do not approach a wheel lock condition, or because the vehicle has been stopped.

A modulator constructed in accordance with the invention continues to provide a significant hydraulic support pressure due to the support spring 90 even when there is no vacuum from source 100. It also has increased hydraulic support pressure during normal operation because of the super-atmospheric air support portion of the modulator. The four-chamber arrangement in which pressure differentials act on two diaphragms and support plates arranged in tandem permits a smaller overall physical size to obtain the desired amount of hydraulic pressure support as compared to a modulator having a single diaphragm and support plate or to one which has more than one support spring. The use of super-atmospheric air support permits the decrease or removal of this support when desired, while the use of another support spring in this area would require that the spring force always be overcome regardless of conditions. The modulator is compatible with different types of brake boosters since it operates in the brake supply-apply pressure circuit. For example, it may be utilized with a vacuum booster, a hydraulic booster, or a direct apply pressure system. The modulator has a fail-safe operation in that there is significant support pressure, which will permit rear wheel brake operation, retained under any one of several conditions that may possibly occur. Such conditions include loss of supply vacuum, loss of super-atmospheric air supply, loss of effectiveness of the support spring, and leakage of any pneumatic seal. This, therefore, assures substantially normal transmission of brake supply-apply pressures between the master cylinder and the rear wheel brakes even under conditions that render the modulator ineffective to modulate. When super-atmospheric air pressure is also supplied to opening 114, quicker responses may be obtained, especially when operating in higher altitudes where the vacuum-to-atmospheric air pressure differential is substantially less than at sea level.

What is claimed is:

1. A wheel brake apply pressure control modulator system for vehicle wheel brake means in a vehicle having a source of wheel brake supply pressure, a wheel brake apply pressure control modulator having modulating valve means, conduit means connecting said wheel brake supply pressure source through said modulator modulating valve means to provide wheel brake apply pressure to the vehicle wheel brake means, and wheel lock sensing and logic control means sensing the conditions of the vehicle wheel means with which the vehicle wheel brake means is associated and generating modulator control signals; said system comprising:

said wheel brake apply pressure control modulator;

first and second and third sources of subatmospheric air pressure, atmospheric air pressure, and super-atmospheric air pressure, respectively;

said modulaor having a modulating valve means actuating power wall and brake apply pressure support means including a support power wall one side of which is fluid connected to said third source of air pressure, control valve means connected to be controlled by the modulator control signals and fluid connected with said first source of air pressure and at least one of said second and third sources of air pressure and with one side of said actuating power wall and the other side of said support power wall and operable in accordance with the modulator control signals to selectively fluid connect one of said sources of air pressure to act on said one side of said actuating power wall and the other side of said support power wall to move and position said actuating power wall to actuate said modulating valve means to control wheel brake apply pressure delivered to said vehicle wheel brake means and to control the amount of brake apply pressure support provided by super-atmospheric air pressure acting on said support power wall, said first source of air pressure being fluid connected to the other side of said actuating power wall.

2. A wheel brake apply pressure control modulator system for vehicle wheel brake means in a vehicle having a source of wheel brake supply pressure, a wheel brake apply pressure control modulator having modulating valve means, conduit means connecting said wheel brake supply pressure source through said modulator modulating valve means to provide wheel brake apply pressure to the vehicle wheel brake means, and wheel lock sensing and logic control means sensing the conditions of the vehicle wheel means with which the vehicle wheel brake means is associated and generating modulator control signals; said system comprising:

said wheel brake apply pressure control modulator;

first and second and third sources of subatmospheric air pressure, atmospheric air pressure, and super-atmospheric air pressure, respectively;

said modulator having a modulating valve means actuating power wall and brake apply pressure support means including a support power wall one side of which is fluid connected to said third source of air pressure, control valve means connected to be controlled by the modulator control signals and fluid connected with said first and second and third sources of air pressure and with one side of said actuating power wall and the other side of said support power wall and operable in accordance with the modulator control signals to selectively fluid connect one of said sources of air pressure to act on said one side of said actuating power wall and the other side of said support power wall to move and position said actuating power wall to actuate said modulating valve means to control wheel brake apply pressure delivered to said vehicle wheel brake means and to control the amount of brake apply pressure support provided by super-atmospheric air pressure acting on said support power wall, said first source of air pressure being fluid connected to the other side of said actuating power wall.

3. In a wheel lock control mechanism for a vehicle having wheel brake means to be controlled, a source of brake supply and apply pressure, first and second and third sources of subatmospheric air pressure and atmospheric air pressure and super-atmospheric air pressure respectively, conduit means connecting the brake supply and apply pressure source to the wheel brake means, brake apply pressure modulating valve means in the conduit means, and wheel lock control sensor and logic control means sensing the conditions of the wheel means with which the wheel brake means is associated and generating modulator control signals; the improvement comprising a modulator including:

said modulating valve means having a displacement piston as a part thereof;

a housing having a first chamber and a second chamber separated by an upper support plate and diaphragm, a divider plate and diaphragm separating said second chamber and a third chamber, and a lower support plate and diaphragm separating said third chamber and a fourth chamber;

support spring means acting on said upper support plate and operatively urging said displacement piston to the normal brake apply position in which said modulating valve means permits substantially unrestricted passage of brake fluid and pressure between the brake pressure source and the wheel brake means;

a support plate carrier joining said upper and lower support plates and having a passage therethrough continuously fluid connecting said first and third chambers;

conduit means including check valve means fluid connecting the first air pressure source and said second chamber;

port means continuously fluid connecting said fourth chamber and said third air pressure source;

and control valve means connected to be controlled by the modulator control signals generated by the wheel lock control sensor and logic control means and selectively fluid connecting said first chamber with the first air pressure source and said second chamber when the normal brake apply condition is required and, when a brake release condition is required, fluid disconnecting said first chamber from the first air pressure source and from said second chamber and fluid connecting said first chamber to one of the second and third air pressure sources;

hydraulic brake apply pressure support being provided by said support spring and also by the pressure differential of said third and fourth chambers acting across said lower support plate and diaphragm during normal brake apply, the portion of said hydraulic brake apply pressure support provided by the pressure differential being decreased when the brake release condition is required in accordance with the decrease in pressure differential between said third and fourth chambers as said first and third chambers are opened to said one of the second and third air pressure sources under control of said control valve means;

the increase in pressure differential of said first and second chambers, caused by the admission of air pressure from said one of the second and third air pressure sources to said first chamber by said control valve means, acting on said upper support plate and diaphragm to overcome the force of said support spring and permit movement of said displacement piston under influence of brake apply pressure to effect a decrease in the brake apply pressure.

4. The modulator of claim 3 further including:

selector valve means fluidly intermediate said control valve means and said source of super-atmospheric pressure air, said selector valve means having a super-atmospheric pressure air inlet fluid connected to said source of super-atmospheric pressure air and an outlet fluid connected to said control valve means and another inlet fluid connected to atmospheric air, said selector valve means being operable to selectively connect one of said inlets with said outlet to selectively make available to said control valve means atmospheric air and super-atmospheric pressure air for connection to said first chamber when a brake release condition is required.

* * * * *